US012613481B2

(12) United States Patent
Nozawa et al.

(10) Patent No.: US 12,613,481 B2
(45) Date of Patent: Apr. 28, 2026

(54) RECORDING DEVICE

(71) Applicant: SEIKO EPSON CORPORATION, Tokyo (JP)

(72) Inventors: Akimasa Nozawa, Tatsuno-Machi (JP); Ryuji Moriyama, Matsumoto (JP); Tsutomu Ozaki, Matsumoto (JP); Yuta Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 534 days.

(21) Appl. No.: 18/181,052

(22) Filed: Mar. 9, 2023

(65) Prior Publication Data

US 2023/0288838 A1 Sep. 14, 2023

(30) Foreign Application Priority Data

Mar. 10, 2022 (JP) ................................ 2022-036897

(51) Int. Cl.
*G03G 15/04* (2006.01)
*G03G 15/16* (2006.01)

(52) U.S. Cl.
CPC ... *G03G 15/04036* (2013.01); *G03G 15/1615* (2013.01); *G03G 2215/00379* (2013.01); *G03G 2215/0872* (2013.01)

(58) Field of Classification Search
CPC ......... G03G 15/04036; G03G 15/1615; G03G 2215/00379; G03G 2215/0872
USPC ........................................................ 347/108
See application file for complete search history.

(56) References Cited

U.S. PATENT DOCUMENTS

2013/0266335 A1* 10/2013 Miyagawa ............ G03G 15/50 399/81
2015/0177661 A1* 6/2015 Miyagawa ......... G03G 15/5016 399/75
2016/0124340 A1* 5/2016 Miyagawa ......... G03G 15/5016 399/221

FOREIGN PATENT DOCUMENTS

JP 2021008106 1/2021
JP 2021-187046 A 12/2021

* cited by examiner

*Primary Examiner* — Jason S Uhlenhake
*Assistant Examiner* — Alexander D Shendervo
(74) *Attorney, Agent, or Firm* — WORKMAN NYDEGGER

(57) ABSTRACT

A recording device includes a support portion that supports a medium, a recording unit that performs recording on the supported medium, an irradiation unit that emits light on the medium on which recording is performed, a housing that covers the support portion, the recording unit, and the irradiation unit, wherein the housing includes light transmissive members through which an inside of the housing is visually recognizable, the light transmissive members being provided at four surfaces including an upper surface, a left side surface, a right side surface, and a front surface that constitute the housing, the light transmissive members being configured to reduce transmittance of light transmitted through the four surfaces from the inside of the housing.

4 Claims, 4 Drawing Sheets

RECORDING DEVICE

The present application is based on, and claims priority from JP Application Serial Number 2022-036897, filed Mar. 10, 2022, the disclosure of which is hereby incorporated by reference herein in its entirety.

BACKGROUND

1. Technical Field

The present disclosure relates to a recording device.

2. Related Art

Conventionally, as illustrated in JP-A-2021-187046, a recording device including a housing surrounding a recording unit or the like is known. The housing on a front surface side of the recording device is provided with a front cover formed of a transparent member, and an inside of the housing is configured to be visually recognized via the front cover.

However, in the recording device described above, since the inside of the housing is visually recognized only from the front surface side of the recording device, there is a problem in that a place where a recording state during recording is visually recognized is limited.

SUMMARY

A recording device includes a support portion that supports a medium, a recording unit that performs recording on the supported medium, an irradiation unit that emits light on the medium on which recording is performed, a housing that covers the support portion, the recording unit, and the irradiation unit, wherein the housing includes light transmissive members through which an inside of the housing is visually recognizable, the light transmissive members being provided at four surfaces including an upper surface, a left side surface, a right side surface, and a front surface that constitute the housing, the light transmissive members being configured to reduce transmittance of light transmitted through the four surfaces from the inside of the housing.

DESCRIPTION OF EXEMPLARY EMBODIMENTS

First, a configuration of a recording device 1 will be described. The recording device 1 is a printer that performs recording on a medium M. The medium M is a sheet, a cloth, or a three dimensional object. The sheet is, for example, a sheet made of paper, a synthetic resin, or the like. The cloth is, for example, a nonwoven fabric, a knit, a fabric, or the like. The three dimensional object is, for example, a decorative article such as clothes or shoes, a daily commodity, a machine part, or the like.

In each of the following drawings, an X-axis, a Y-axis, and a Z-axis are illustrated. The X-axis, the Y-axis, and the Z-axis are orthogonal to each other. The Z-axis is an axis extending in the vertical direction. The X-axis and Y-axis are parallel to the horizontal plane. In the following description, a direction along the X-axis is referred to as a left-right direction, and a direction along the Y-axis is referred to as a front-rear direction.

Figure 1:
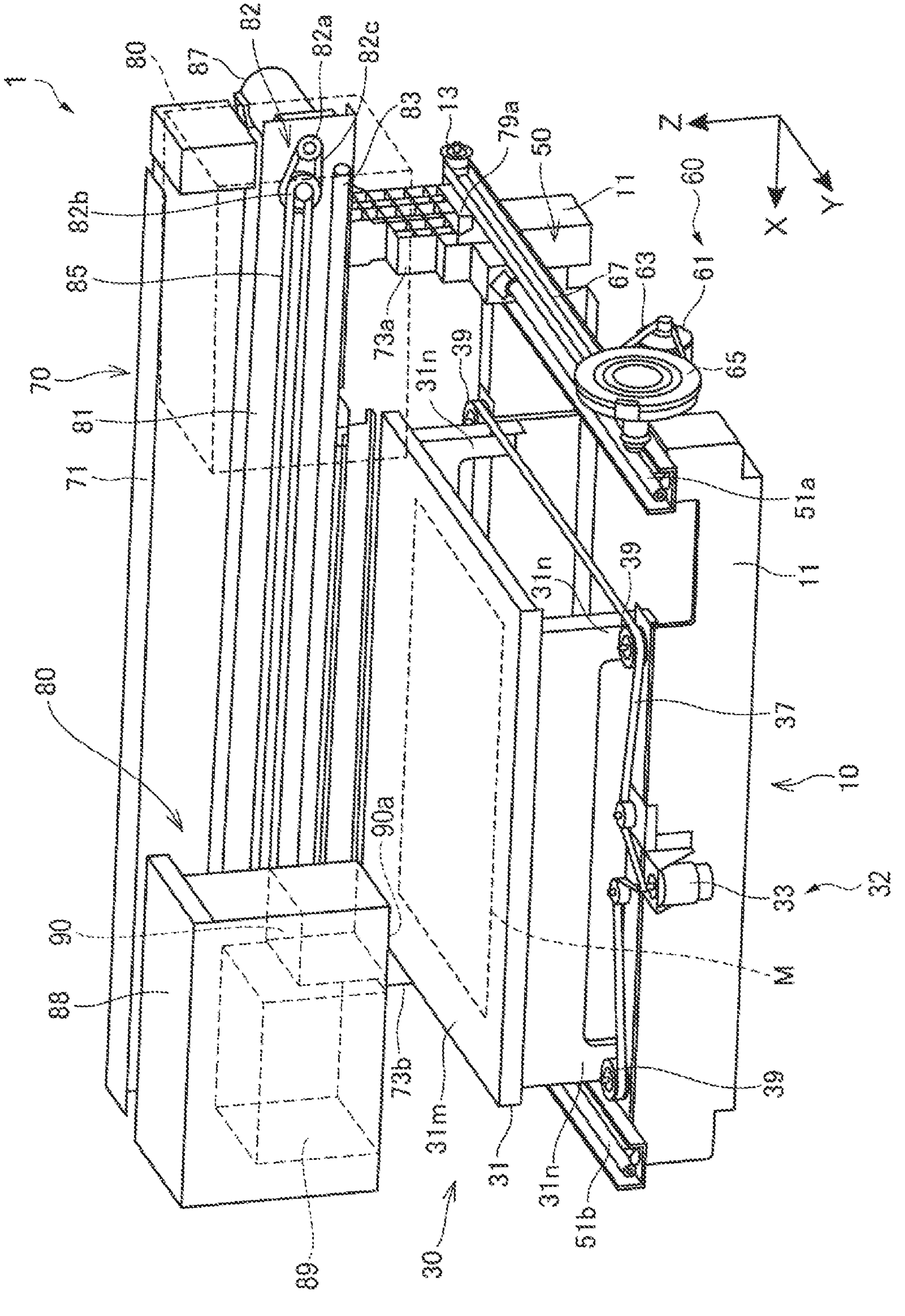
FIG. 1 is a perspective view illustrating a configuration of a recording device.

As illustrated in FIG. 1, the recording device 1 includes a main body unit 10 and a moving unit 70. The main body unit 10 is a pedestal fixed to an installation surface of the recording device 1. The moving unit 70 moves along the Y-axis with respect to the main body unit 10. The recording device 1 includes a housing 2 (FIG. 2A) that covers the main body unit 10 and the moving unit 70. FIG. 1 is a diagram with the housing 2 being omitted. Note that the configuration of the housing 2 will be described later.

The main body unit 10 includes a base portion 11, a medium support mechanism 30 and a driving mechanism 50. The base portion 11 is fixed to the installation surface of the recording device 1, and supports each portion of the recording device 1.

The medium support mechanism 30 includes a table 31 as a support portion that supports the medium M, and a height moving mechanism 32.

The table 31 includes a flat plate having a rectangular shape and four table leg portions 31*n* arranged in four corners of the flat plate. The table 31 of the present embodiment is a base that does not move in a direction along the X-axis and in a direction along the Y-axis. A medium support portion 31*m* on which the medium M is placed is formed on an upper surface of the table 31. The medium support portion 31*m* has a flat surface. The shape and size of the medium M are not limited to the extent that the medium M do not protrude from the medium support portion 31*m*. Note that an end portion of the medium M may protrude from the medium support portion 31*m*. The height of the medium M corresponds to the size of the medium M in the +Z direction.

The height moving mechanism 32 includes a lifting motor 33, a lifting belt 37, and a lifting mechanism 39, and moves the table 31 in a direction along the Z-axis. The lifting mechanism 39 is provided at each of the four table leg portions 31*n*. The lifting mechanism 39 includes a ball screw disposed along the Z-axis, a nut screwed to the ball screw, and a pulley. The ball screw of the lifting mechanism 39 is rotatably supported at the base portion 11. The nut of the lifting mechanism 39 is fixed to the table leg portion 31*n*. The pulley of the lifting mechanism 39 is fixed to an upper portion of the ball screw. When the pulley of the lifting mechanism 39 rotates, the ball screw rotates, and the table leg portion 31*n* moves along the Z-axis together with the nut in accordance with the rotation of the ball screw.

The lifting belt 37 is an annular belt stretched between an output shaft of the lifting motor 33 and the pulleys of the four lifting mechanisms 39. A rotation direction and an amount of rotation of the lifting motor 33 are controlled, and the lifting motor 33 is rotated, and thus the lifting belt 37 is circularly driven. The lifting belt 37 transmits the rotation of the lifting motor 33 to the pulleys of the four lifting mechanisms 39. Accordingly, the ball screw of the lifting mechanism 39 rotates to move the table 31 (medium support portion 31*m*) along the Z-axis.

The rotation direction of the lifting motor 33 can be switched between a forward direction in which the table 31 moves upward, and a reverse direction in which the table 31 moves downward. The recording device 1 raises and lowers the table 31 in accordance with the height size of the medium M by operating the lifting motor 33.

The driving mechanism 50 includes a first guide shaft 51*a*, a second guide shaft 51*b*, and a frame driving unit 60. Each of the first guide shaft 51*a* and the second guide shaft 51*b* is disposed on the base portion 11 along the Y-axis. The first guide shaft 51*a* is fixed to an end portion of the base portion 11 in the −X direction, and the second guide shaft 51*b* is fixed to an end portion of the base portion 11 in the +X direction.

The moving unit 70 includes a main frame 71, a first leg portion 73*a*, a second leg portion 73*b*, and a recording unit 80.

The main frame 71 is a plate member elongated in the direction along the X-axis. The size of the main frame 71 in the left-right direction is larger than the size of the base portion 11. The first leg portion 73*a* fits into the first guide shaft 51*a* and extends in a direction along the Z-axis. The first leg portion 73*a* is movable along the first guide shaft 51*a*. The second leg portion 73*b* fits into the second guide shaft 51*b* and extends in the direction along the Z-axis. The second leg portion 73*b* is movable along the second guide shaft 51*b*. The main frame 71 is fixed to upper portions of the first leg portion 73*a* and the second leg portion 73*b* and is supported from below by the first leg portion 73*a* and the second leg portion 73*b*. The main frame 71 is guided together with the first leg portion 73*a* and the second leg portion 73*b* by the first guide shaft 51*a* and the second guide shaft 51*b*, and moves along the Y-axis.

The frame driving unit 60 includes a frame moving motor 61, a transmission belt 63, a transmission mechanism 65, and a transmission belt 67.

The transmission belt 63 is an annular belt stretched between an output shaft of the frame moving motor 61 and the transmission mechanism 65 and transmits a driving force of the frame moving motor 61 to the transmission mechanism 65. The transmission mechanism 65 includes a first pulley and a second pulley, and the transmission belt 63 is wound around the first pulley, and the transmission belt 67 is wound around the second pulley. The transmission mechanism 65 drives the transmission belt 67 by rotating the second pulley by a driving force transmitted from the transmission belt 63 to the first pulley. The transmission mechanism 65 transmits the driving force of the frame moving motor 61 to the transmission belt 67 at a deceleration ratio corresponding to a ratio of diameters of the first pulley and the second pulley.

The transmission belt 67 is an annular belt stretched between the transmission mechanism 65 and a pulley 13 disposed at an end portion of the base portion 11 in the −Y direction. The pulley 13 is rotatably installed with respect to the base portion 11. The transmission belt 67 is disposed along the first guide shaft 51*a*. The transmission belt 67 is fixed to the first leg portion 73*a* via a belt connecting portion 79*a*. Thus, power for moving the first leg portion 73*a* along the Y-axis acts on the first leg portion 73*a* by the transmission belt 67 being circularly driven. Thus, the moving unit 70 moves along the Y-axis.

The rotation direction of the frame moving motor 61 can be switched between a forward direction in which the main frame 71 moves in the +Y direction, and a reverse direction in which the main frame 71 moves in the −Y direction. The recording device 1 moves the main frame 71 forward and backward by operating the frame moving motor 61.

The second leg portion 73*b* of the moving unit 70 is guided by the second guide shaft 51*b*. Thus, the main frame 71 moves in parallel in the +Y direction and the −Y direction along the first guide shaft 51*a* and the second guide shaft 51*b*.

A carriage support frame 81, a transmission mechanism 82, a carriage guide shaft 83, and a carriage driving motor 87 are installed on the main frame 71.

The recording unit 80 includes a carriage 88, a recording head 89 as a recording unit, and an irradiation unit 90.

The carriage support frame 81 is a plate member elongated in the direction along the X-axis. The carriage guide shaft 83 is fixed to the carriage support frame 81 along the X-axis. The carriage 88 is supported by the carriage support frame 81 and the carriage guide shaft 83 and is movable along the carriage guide shaft 83. In a range where the carriage 88 moves along the X-axis, a position of one end (e.g., the end portion in the −X direction) is set as a home position. For example, a mechanism for performing maintenance such as flushing or cleaning of the recording head 89 is disposed in the home position.

A carriage driving belt 85 is an annular belt stretched between the transmission mechanism 82 disposed at one end portion of the carriage support frame 81 and a pulley (not illustrated) disposed at the other end portion of the carriage support frame 81. The carriage driving belt 85 is disposed along the carriage guide shaft 83.

The transmission mechanism 82 includes a pulley 82*a*, a two-stage pulley 82*b*, and a belt 82*c*. The pulley 82*a* is fixed to an output shaft of the carriage driving motor 87. The belt 82*c* is an annular belt stretched between the pulley 82*a* and the two-stage pulley 82*b*. The two-stage pulley 82*b* includes a small pulley and a large pulley having a larger diameter than a diameter of the small pulley. The belt 82*c* is wound around the large pulley, and the carriage driving belt 85 is wound around the small pulley. The belt 82*c* is circularly driven in accordance with the rotation of the carriage driving motor 87 to rotate the large pulley of the two-stage pulley 82*b*. The small pulley of the two-stage pulley 82*b* rotates together with the large pulley to circularly drive the carriage driving belt 85. In this manner, the rotation of the carriage driving motor 87 is transmitted to the carriage driving belt 85 at a deceleration ratio corresponding to a ratio of diameters of the large pulley and the small pulley in the two-stage pulley 82*b*.

The carriage 88 is coupled to the carriage driving belt 85. Thus, when the carriage driving belt 85 is circularly driven, the carriage 88 moves along the X-axis. The recording head 89 and the irradiation unit 90 are mounted on the carriage 88. By the carriage 88 moving along the X-axis, the recording head 89 and the irradiation unit 90 move in the left-right direction, that is, in the +X direction and the −X direction. Additionally, by the main frame 71 moving along the Y-axis, the recording head 89 and the irradiation unit 90 move in the front-rear direction, that is, in the +Y direction and the −Y direction. Accordingly, the recording device 1 can move the recording head 89 and the irradiation unit 90 in the front-rear direction and the left-right direction with respect to the table 31. Thus, an ink as a liquid can be discharged to the entire medium M supported by the table 31.

The recording head 89 includes a plurality of nozzles (not illustrated) configured to discharge the ink. These nozzles are opened at a lower end surface of the recording head 89, and the ink is discharged from the nozzles. The ink discharged from the recording head 89 flies between the lower end surface of the recording head 89 and the medium M placed on the table 31, and lands on the medium M. A distance between the lower end surface of the recording head 89 and the medium M is referred to as a recording gap.

The recording device 1 has a function of adjusting the size of the recording gap in order to perform recording with high quality with respect to the medium M. Specifically, the recording device 1 operates the lifting motor 33 to raise or lower the table 31 so that the recording gap is adjusted to be an appropriate size.

The ink of the present embodiment is an ink having photocurability (photocurable ink). The photocurable ink is an ultraviolet curable ink, and has a property of being cured when irradiated with light including ultraviolet. The photocurable ink includes a colorant such as a pigment, a photopolymerizable monomer, and a photopolymerization initiator system, and includes, as necessary, other various additives, such as a photosensitizer, a polymerization inhibitor, a scavenger, an antioxidant, an ultraviolet absorber, a plasticizer, a surfactant, a leveling agent, a thickener, a dispersant, an antifoaming agent, a preservative, a solvent, or the like.

The irradiation unit 90 emits light to the medium M on which recording is performed (applied photocurable ink). The irradiation unit 90 includes a UV lamp, and light including ultraviolet is emitted downward from the irradiation surface 90*a* at an end portion of the irradiation unit 90 in the −Z direction. The photocurable ink applied to the medium M is cured by being irradiated with ultraviolet rays, and an ink layer is formed on the medium M. The irradiation unit 90 of the present embodiment is mounted on the −X direction side of the recording head 89. In this way, light is emitted from the irradiation unit 90 while the recording head 89 is caused to scan to discharge the ink, and thus the ink applied to the medium M can be cured.

Next, a configuration of the housing 2 will be described. The recording device 1 is provided with the housing 2 in consideration of suppression of diffusion of odor of the photocurable ink used, prevention of adhesion of dust or the like to the medium M, environment and workability such as transmission suppression of external light, and the like.

Figure 2A:
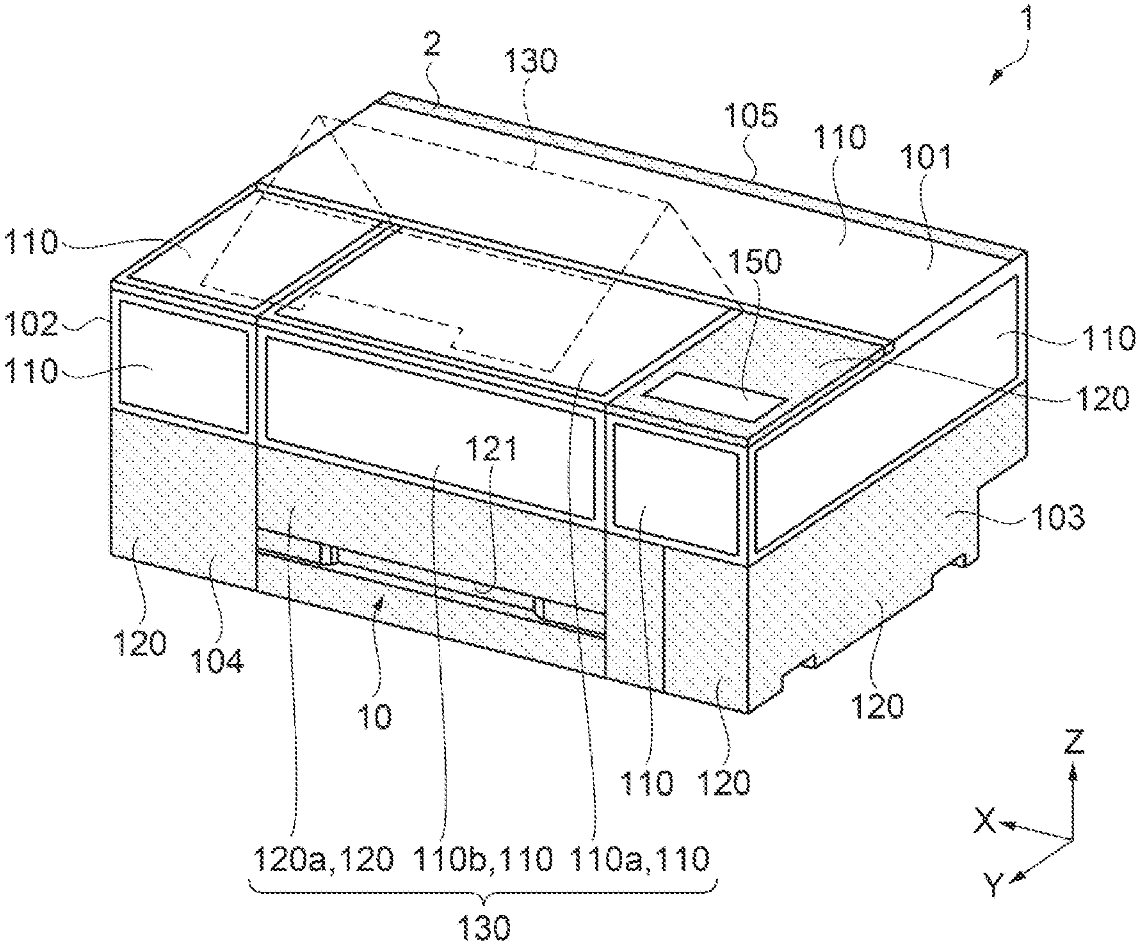
FIG. 2A is a perspective view illustrating a configuration of a housing.
Figure 2B:
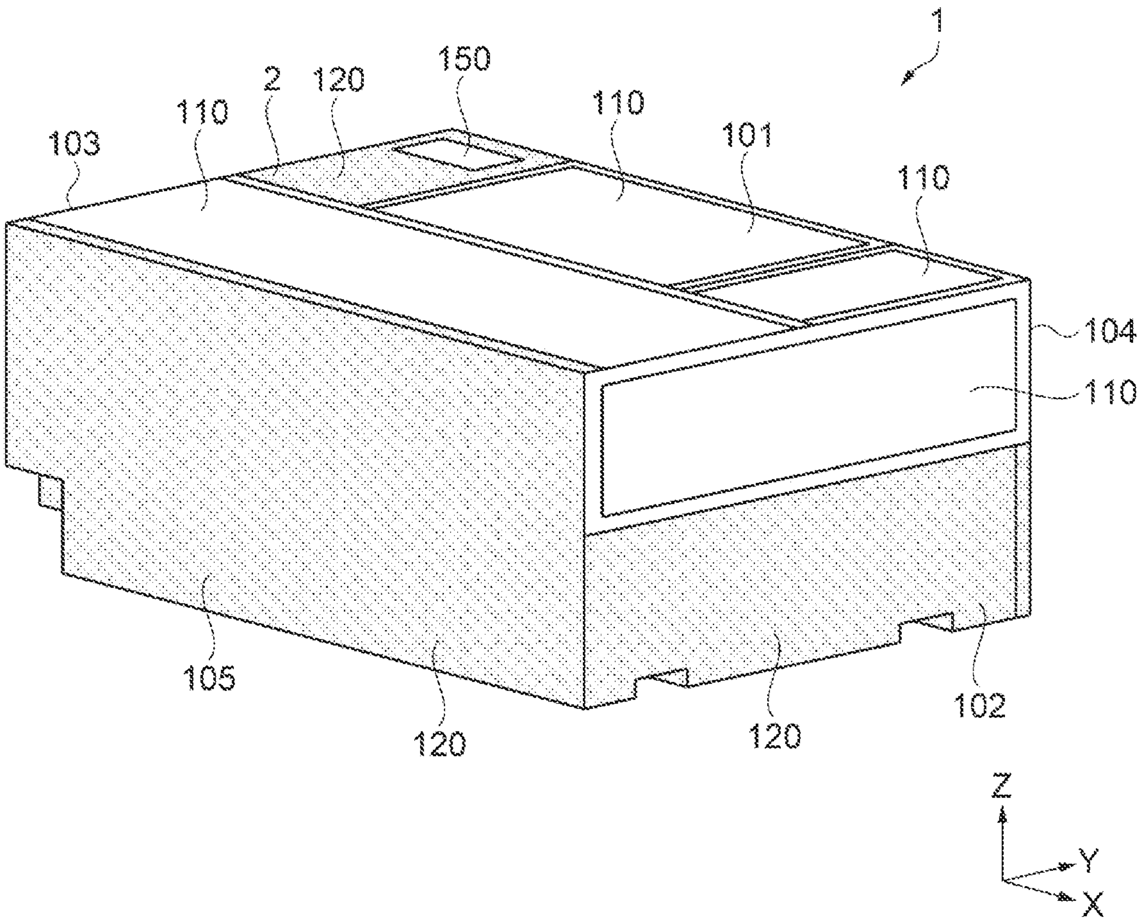
FIG. 2B is a perspective view illustrating a configuration of a housing.

As illustrated in FIGS. 2A and 2B, the housing 2 has a box shape, and has a first surface 101 (upper surface) at an end portion in the +Z direction, a second surface 102 (left side surface) at an end portion in the +X direction, a third surface 103 (right side surface) at an end portion in the −X direction, a fourth surface 104 (front surface) at an end portion in the +Y direction, and a fifth surface 105 (rear surface) at an end portion in the −Y direction.

The entire surface of the first surface 101 is substantially flat surface in the horizontal direction. Accordingly, the medium M on which recording is performed can be placed on the first surface 101, and image content can be easily confirmed. In addition, an electronic apparatus such as a personal computer or the like can be placed on the first surface 101, and workability can be improved.

An operation panel 150 is disposed on the first surface 101. The operation panel 150 is a panel configured to operate the recording device 1 by a user. The operation panel 150 includes a power button, an input button for inputting a recording condition, and a display screen for displaying information such as a recording status, and the like.

Each of the four surfaces including the first surface 101, the second surface 102, the third surface 103, and the fourth surface 104 includes a light transmissive member 110 through which an inside of the housing 2 being visually recognized and capable of reducing the transmittance of light transmitted through the first surface 101, the second surface 102, the third surface 103, and the fourth surface 104 by the irradiation unit 90 from the inside of the housing 2.

The light transmissive member 110 is a plate member. The light transmissive member 110 of the present embodiment is formed of polycarbonate. The light transmissive member 110 has a thickness of several mm, for example, and has predetermined transmittance. An appearance color of the light transmissive member 110 is grey. Accordingly, the inside of the housing 2 can be visually recognized from four directions (the upper surface, the left side surface, the right side surface, and the front surface) while glare when the emitted light from the irradiation unit 90 is transmitted to the outside of the housing 2 is suppressed, and thus visual recognition into the housing 2 can be improved. Accordingly, the recording state and the like by the recording unit 80 can be checked from the outside of the housing 2 via the light transmissive member 110.

In a case where the height of the irradiation surface 90*a* of the irradiation unit 90 is set as a reference position, the light transmissive member 110 is disposed at a part above the reference position in the first surface 101, the second surface 102, the third surface 103, and the fourth surface 104. On the other hand, a non light transmissive member 120 that does not transmit emitted light from the irradiation unit 90 is disposed at a part below the reference position. The non light transmissive member 120 has a plate shape, and is formed of, for example, a sheet metal or a plastic member.

Specifically, the first surface 101 is located above the reference position (irradiation surface 90*a*), and the light transmissive member 110 is disposed on substantially the entire surface of the first surface 101. Note that in the present embodiment, at a part in which the operation panel 150 of the first surface 101 is installed, the non light transmissive member 120 is used, but the light transmissive member 110 may be used.

Additionally, in the second surface 102, the light transmissive member 110 is disposed on the entire surface of a part above the reference position (irradiation surface 90*a*) of the second surface 102, and the non light transmissive member 120 is disposed on the entire surface of a part below the reference position of the second surface 102. Similarly, in the third surface 103, the light transmissive member 110 is disposed on the entire surface of a part above the reference position of the third surface 103, and the non light transmissive member 120 is disposed on the entire surface of a part below the reference position of the third surface 103.

Additionally, in the fourth surface 104, the light transmissive member 110 is disposed on the entire surface of a part above the reference position of the fourth surface 104, and the non light transmissive member 120 is disposed on the entire surface of a part below the reference position of the fourth surface 104.

Also, the non light transmissive member 120 is disposed on the entire surface of the fifth surface 105. This is because it is not necessary to check the recording state of the recording unit 80 from the rear surface of the recording device 1.

In this way, the light transmissive member 110 is disposed in a region where the recording state by the recording unit 80 can be checked, and the non light transmissive member 120 is disposed in other regions, and thus visual recognition in the housing 2 can be improved while glare of the emitted light from the irradiation unit 90 is suppressed as compared with a case where the light transmissive member 110 is disposed in the entire housing 2.

Note that in the present embodiment, since the table 31 is configured to move in the vertical direction with respect to the irradiation unit 90 (recording unit 80), the position of the irradiation surface 90*a* is constant, but for example, in a case where the irradiation unit 90 (recording unit 80) is configured to be movable in the vertical direction with respect to the table 31, and the irradiation surface 90*a* is movable from a first position to a second position above the first position, the light transmissive member 110 is disposed at a part above the irradiation surface 90*a* at the second position. Even with this configuration, similar advantages as described above can be obtained.

Also, as illustrated in FIG. 2A, the housing 2 includes a front cover 130. The front cover 130 is provided so as to be able to open and close a part of the front surface and a part of the upper surface of the housing 2. By shifting the front cover 130 to the open state, the medium M can be set on the table 31 and the medium M can be removed after recording. In FIG. 2A, the front cover 130 in the open state is illustrated in dashed lines.

The front cover 130 of the present embodiment is integrated with the light transmissive member 110*a* disposed on the +Y direction side and at a center portion in the direction along the X-axis of the first surface 101, the light transmissive member 110*b* disposed on the +Z direction side and at a center portion in the direction along the X-axis of the fourth surface 104, and the non light transmissive member 120*a* disposed below the light transmissive member 110*b* of the fourth surface 104.

A rotary shaft extending along the X-axis is provided at an end portion of the light transmissive member 110*a* of the front cover 130 in the −Y direction, and the front cover 130 can move upward around the rotary shaft. In the front cover 130 in the closed state, a notch portion 121 is formed at an end portion of the non light transmissive member 120*a* in the −Z direction. The user can smoothly shift the front cover 130 from the closed state to the open state by pushing the front cover 130 upward with user's fingers on the notch portion 121.

Figure 3:
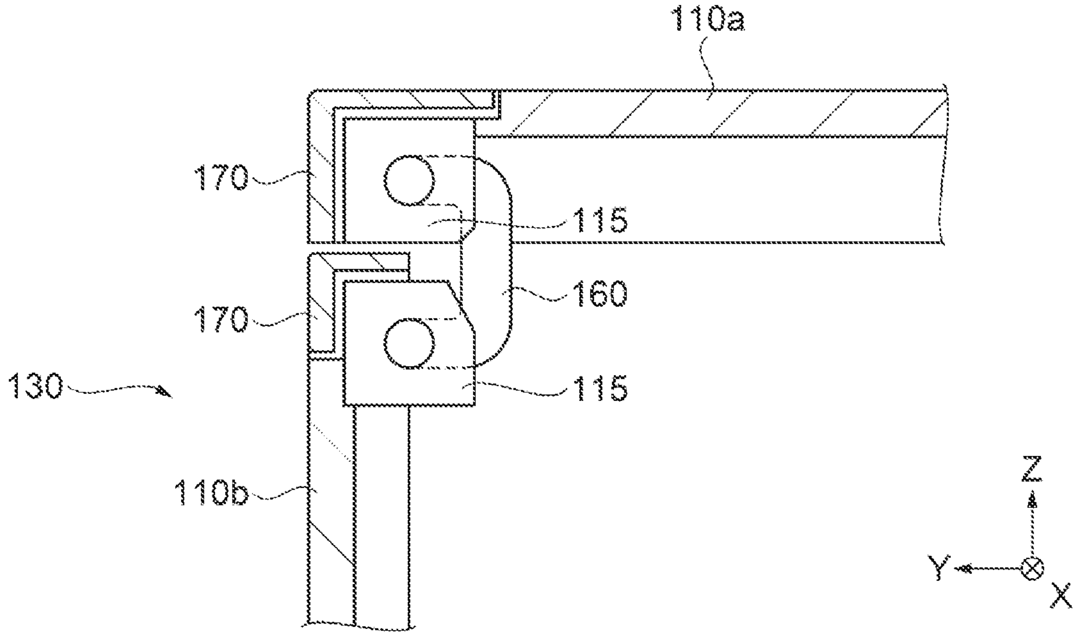
FIG. 3 is a side cross-sectional view illustrating a configuration of a coupling member.

As illustrated in FIG. 3, the light transmissive members 110*a* and 110*b* of the front cover 130 are coupled to each other by a coupling member 160. Specifically, an end portion of the light transmissive member 110*a* in the +Y direction and an end portion of the light transmissive member 110*b* in the +Z direction are coupled to each other by the coupling member 160. The coupling member 160 of the present embodiment includes a hinge mechanism, and is configured such that with respect to one light transmissive member 110*a*, the other light transmissive member 110*b* is displaceable within a predetermined angle range around a coupled portion.

The light transmissive members 110*a* and 110*b* include coupling portions 115, respectively, coupled by the coupling member 160 and each of the coupling portions 115 is transmissive. The coupling portion 115 is formed of, for example, polycarbonate. That is, in the present embodiment, the light transmissive member 110*a* and the coupling portion 115 (the light transmissive member 110*b* and the coupling portion 115) are integrally formed. Since the coupling portion 115 coupled to the coupling member 160 is transmissive, visual recognition in the housing 2 can be further improved.

Note that each end side portion of the light transmissive members 110 (110*a* and 110*b*) of the present embodiment is held by a frame body 170 having a rectangular shape and having an opening. The frame body 170 is formed of a plastic member or a sheet metal. Thus, damage, distortion, and the like of the light transmissive members 110 can be suppressed.

What is claimed is:

1. A recording device comprising:

a support portion configured to support a medium;

a recording unit configured to perform recording on the supported medium;

an irradiation unit configured to emit light on the medium on which recording is performed;

a housing configured to cover the support portion, the recording unit, and the irradiation unit, wherein the housing includes light transmissive members through which an inside of the housing is visually recognizable, the light transmissive members being provided at four surfaces including an upper surface, a left side surface, a right side surface, and a front surface that constitute the housing, the light transmissive members being configured to reduce transmittance of light transmitted through the four surfaces from the inside of the housing.

2. The recording device according to claim 1, wherein each of the light transmissive members is coupled to each other by a coupling member, and a coupling portion of each of the light transmissive members is transmissive, the coupling portion being coupled by the coupling member.

3. The recording device according to claim 1, wherein when a height of an irradiation surface of the irradiation unit is a reference position, the light transmissive member is disposed at a part above the reference position, and a non-light transmissive member that does not transmit the light is disposed at a part below the reference position in the four surfaces.

4. The recording device according to claim 3, wherein the irradiation unit emits light downward.

* * * * *